United States Patent [19]
Prijn

[11] 3,713,370
[45] Jan. 30, 1973

[54] ARRANGEMENT FOR COUPLING A FLASH BULB HOLDER TO A CAMERA

[76] Inventor: Cornelis Prijn, Emmasingel, Eindhoven, Netherlands

[22] Filed: Nov. 2, 1971

[21] Appl. No.: 194,954

[30] Foreign Application Priority Data

Nov. 6, 1970  Netherlands ....................... 7016260

[52] U.S. Cl. ................. 95/11 L, 240/1.3, 240/52.15, 339/12 R, 339/12 L
[51] Int. Cl. ..................... G03b 15/03, G03b 15/035
[58] Field of Search ................ 95/11 L, 11 R, 11.5 R; 240/1.3, 52.15; 339/12 R, 12 G, 12 L

[56] References Cited

UNITED STATES PATENTS

| 3,583,304 | 6/1971 | Brandt | 95/11.5 R |
| 3,598,985 | 8/1971 | Harnden et al. | 95/11 L |
| 3,521,216 | 7/1970 | Tolegian | 339/12 R |

*Primary Examiner*—Robert P. Greiner
*Attorney*—Frank R. Trifari

[57] ABSTRACT

A connection arrangement for coupling a holder for at least one flash bulb to a camera includes a magnetic system in the camera adapted to cooperate to a ferromagnetic portion of the holder. Symmetrical positioning elements which preferably have a searching construction form part of the holder and enable the holder to be used in two separate orientations which are 180° relative to each other.

4 Claims, 4 Drawing Figures

ARRANGEMENT FOR COUPLING A FLASH BULB HOLDER TO A CAMERA

The invention relates to a camera comprising a connection device for cooperation with a holder for at least one flash bulb, said connection device comprising at least two electric contact members which are connected to contact members present in the holder by coupling the holder to the camera. Such a camera is known.

In the known cameras of this type the flash bulb holder is often coupled to the camera by means of a snap fastener, a coupling being effected by an inserting movement which may be followed by a rotating movement. It will often occur that the photographer does not succeed in effecting the coupling of the holder to the camera without difficulties, because the holder must be brought in the correct position relative to the camera prior to performing the inserting movement.

It is the object of the invention to provide a camera which comprises a connection device with which the coupling of a holder for one or more flash bulbs to the camera can be realized in a very simple manner.

For that purpose, the camera according to the invention is characterized in that the connection device is constituted by a magnetic system of which a part emerging on the outside of the camera and capable of cooperation with a ferromagnetic part of the holder constitutes one of the electric contact members, the connection device comprising at least two positioning means for cooperation with positioning members which preferably have a searching construction and which form part of the holder. As a result of this it is possible to effect the mechanical and electrical coupling very rapidly. It is even not necessary for the holder to be brought, during coupling, in an accurately prescribed position opposite to the connection device when the positioning members of the holder have a searching construction. The holder is then drawn magnetically into the desirable position.

A favorable embodiment of the camera according to the invention is characterized in that the two poles of the magnetic system emerge in the outer surface of the camera and can cooperate with a non-rotationally symmetric ferromagnetic plate which forms part of the holder If the ferromagnetic strip of material of the holder is proportioned so that said strip can cover the two poles of the magnet system simultaneously only in one position of the holder relative to the camera, the magnetic force will force the holder which is placed on the camera in an inclined angular position to said given position.

An embodiment of the camera according to the invention is characterized in that the positioning means are constituted by apertures provided in the outer wall of the camera on either side of the poles of the magnetic system.

A holder for at least one flash bulb and constructed for cooperation with a camera according to the invention is characterized in that said holder has a base plate which is provided with a plate formed from a ferromagnetic material and constructed as a contact member, conical or spherical orienting cams being arranged on either side of said plate and having a searching fit in the apertures provided in the wall of the camera. When the holder is coupled to the camera, the ferromagnetic plate cooperates with the poles of the magnetic system. As a result of this the electric contact is also produced.

A further embodiment of the holder as described above is characterized in that said holder can be coupled to the camera according to two positions which are rotated relative to each other through an angle of 180°, the orienting cams being arranged beside the ferromagnetic plate diametrically relative to the center of the plate, the holder furthermore comprising contact members which are also arranged beside and diametrically relative to the center of the plate and which can cooperate with a contact member provided in the wall of the camera beside the magnetic system. This embodiment is advantageous in particular when the holder comprises two parallel rows of combustion flash bulbs. First the bulbs of one row are fired, the holder is then detached, rotated through 180°, and again connected to the camera after which the next row of bulbs can be fired. The rows are connected in pairs to the contact members located diametrically relative to the center of the plate. Only the contact member which is connected to the row of flash bulbs facing the side of the lens of the camera is coupled to the contact member present on the camera beside the magnetic system.

In order that the invention may be readily carried into effect, one embodiment thereof will now be described in greater detail, by way of example with reference to the accompanying drawings, in which FIG. 1 is a perspective exploded view of the diagrammatically shown camera according to the invention with the holder cooperating therewith, the holder in this example comprising two parallel rows of combustion flash bulbs;

Figure 1:
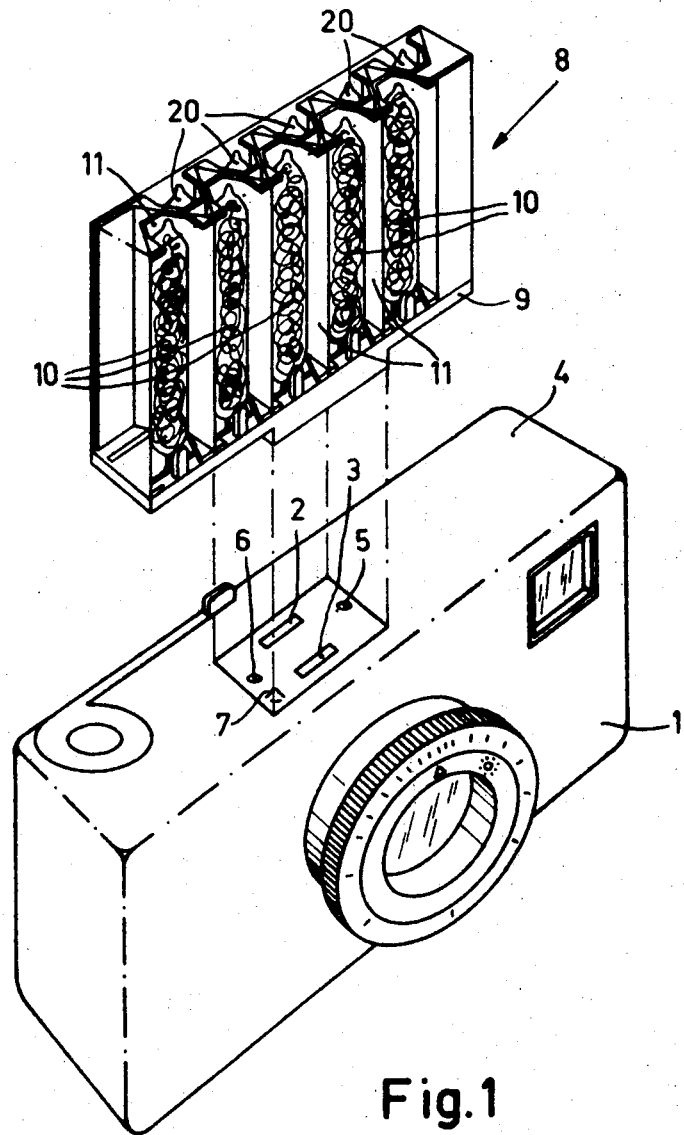
Figure 2:
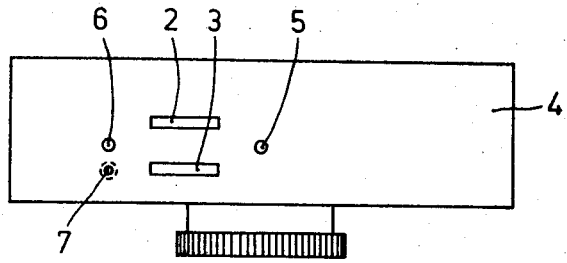
FIG. 2 is the plan view of the camera according to the invention.

As shown in FIGS. 1 and 2, the camera 1 comprises a magnetic system, the rows 2 and 3 of which emerge in the upper surface 4 of the camera 1. In this embodiment the poles 2 and 3 constitute one electric contact member. Apertures 5 and 6 are arranged in the upper surface 4 of the camera on either side of the magnetic system. The camera furthermore comprises a second electric contact member 7 which in this example is of a resilient construction.

Figure 3:
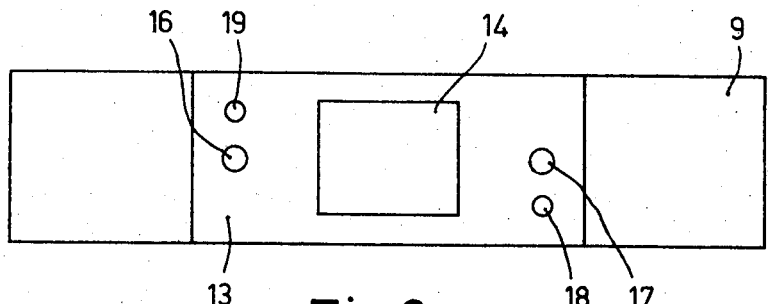
FIG. 3 is the underneath view of the bottom plate of the holder according to the invention.
Figure 4:
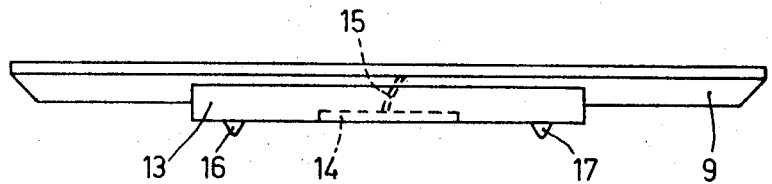
FIG. 4 shows a perspective view of the bottom plate of the holder of FIG. 3.

This camera is suitable for cooperation with a holder 8 for combustion flash bulbs. Two parallel rows of combustion flash bulbs 10, 20 are arranged on the base plate 9 of the holder 8. The flash bulbs 10, 20 are partly surrounded by reflector members 11. The flash bulbs with the reflector members are surrounded by an envelope 12 manufactured from a transparent material and fitting on the base plate 9. As shown in FIGS. 3 and 4, the base plate 9 which in this example is manufactured from a synthetic resin comprises a raised portion 13 in which a ferromagnetic plate 14 is mounted. The dimensions of the plate 14 are such that said plate can just fully cover the poles 2 and 3 of the magnetic system of the camera 1. The ferromagnetic plate will be drawn by the magnetic force into such a position relative to the poles 2, 3 that the plate fully covers the poles. The plate 14 is also constructed as an electric contact member which in FIG. 4 is denoted by the broken lines 15. Two conical cams 16 and 17 which fit in the apertures 5 and 6 in the upper wall of the camera are furthermore provided on the raised portion 13 on either side of the plate 14. Since the cams 16 and 17 have a searching construction, the holder, as a result of the magnetic force, will assume that preferred position in which a row of flash bulbs is transverse to the axial direction of the lens aperture. Furthermore, the raised portion 13 comprises two electric contacts 18 and 19 which are located diametrically relative to the plate 14. When the holder is coupled to the camera, one of the contacts 18, 19 cooperates with the resilient contact 7 of the camera. By rotating the holder through an angle of 180° relative to the camera, the other contact is connected to the resilient contact 7. The electric contact members 18 and 19 are connected to the rows of flash bulbs 10 and 20, respectively. As a result of this, only the flash bulbs of that row can be fired in the coupled position which are present on the side facing the lens of the camera.

Of course the camera according to the invention may also be used for a holder having a smaller number of flash bulbs, for example one or two, The positioning means and members (the apertures 5,6 and the cams 16,17) may be provided in quite different manners, for example, by providing the camera with cams and the holder with apertures.

In this example the holder is constructed for receiving a number of combustion flash bulbs. Of course the invention may also be used for a holder in which an electronic flash bulb is incorporated.

What is claimed is:

1. In a camera, an improved connection arrangement for connecting at least two electric contact members in the camera to corresponding contact members in a holder for at least one flash bulb and for mechanically coupling said camera to said holder, said arrangement comprising:

at least two magnetic members positioned on the outside of said camera and adapted to cooperate with a ferromagnetic portion of said holder, said magnetic members also constituting a single electric contact member;

at least two apertures arranged symmetrically about said magnetic members on the outside of said camera adapted to cooperate with positioning members on said holder and for positioning said holder;

and a second electric contact member on the outside of said camera adapted to cooperate with a contact member on said holder.

2. In combination with said camera of claim 1, a holder for at least one flash bulb comprising:

a base plate including a symmetric ferromagnetic plate, said magnetic plate also being constructed as a contact member for said flash bulb and adapted to couple to said magnetic members in said camera;

orienting cams symmetrically arranged on either side of said plate for searchingly interfilling with the apertures provided in said camera;

and contact members symmetrically arranged on either side of said plate, each of which capable of cooperating with and coupling to said second contact member on said camera, whereby the symmetrical arrangement of said magnetic plate, cams and contact members enables the holder to be coupled to said camera in either of two positions which are rotatably relative to each other by 180°.

3. The combination of claim 2 wherein said orienting cams are of a conical shape.

4. The combination of claim 2 wherein said orienting cams are of a spherical shape.

* * * * *

PO-1050
(5/69)

UNITED STATES PATENT OFFICE
CERTIFICATE OF CORRECTION

Patent No. 3713370         Dated  January 30, 1973

Inventor(s) CORNELIS PRIJN

It is certified that error appears in the above-identified patent and that said Letters Patent are hereby corrected as shown below:

In the heading, before [22] insert --[73] Assignee:

U. S. Philips Corporation--.

Signed and sealed this 13th day of November 1973.

(SEAL)
Attest:

EDWARD M. FLETCHER, JR.              RENE D. TEGTMEYER
Attesting Officer                    Acting Commissioner of Patents Signed and sealed this         day of              , 1973.